United States Patent [19]
Menon et al.

[11] 4,454,137

[45] Jun. 12, 1984

[54] FEED COMPOSITIONS CONTAINING COPPER SALTS OF 2-HYDROXYPYRIDINE-N-OXIDES

[75] Inventors: Govind K. Menon, Downington, Pa.; Winfred J. Sanders, Mt. Holly, N.J.

[73] Assignee: SmithKline Beckman Corporation, Philadelphia, Pa.

[21] Appl. No.: 403,228

[22] Filed: Jul. 29, 1982

[51] Int. Cl.$^3$ .......................................... A61K 31/555
[52] U.S. Cl. .................................................... 424/245
[58] Field of Search ........................................ 424/245

[56] References Cited

U.S. PATENT DOCUMENTS

| | | |
|---|---|---|
| 2,540,218 | 2/1951 | Shaw . |
| 2,752,356 | 6/1956 | Cislak . |
| 2,960,406 | 11/1960 | Cardon . |
| 3,773,770 | 11/1973 | Damico . |
| 3,968,118 | 7/1976 | Lohaus et al. . |
| 3,972,888 | 8/1976 | Lohaus et al. . |

OTHER PUBLICATIONS

Chem. Abst. 10th Collect Index–Gen. Subj., vol. 86–95 (1977–1981), pp. 9064–9066 GS.
Landers et al.–Chem. Abst., vol. 95 (1981), pp. 196, 537j.
E. Shaw et al., J. Am. Chem. Soc. 72 4362 (1950).
G. Newbold et al., J. Chem. Soc. 1948 1864.
W. Barker et al., J. Antibiotics 32 1096 (1979).

*Primary Examiner*—Sam Rosen
*Attorney, Agent, or Firm*—William H. Edgerton; Richard D. Foggio; Alan D. Lourie

[57] ABSTRACT

Copper salts of 2-hydroxypyridine-N-oxides have been demonstrated to possess an ability to alter the metabolic pattern in the digestive tract of food producing animals to make energy producing metabolic units which are more available for absorption by the animals. The copper salts, such as cupric 2-hydroxypyridine-N-oxide, are active ingredients in feed compositions and methods for increasing growth and feed efficiency of these animals.

11 Claims, No Drawings

FEED COMPOSITIONS CONTAINING COPPER SALTS OF 2-HYDROXYPYRIDINE-N-OXIDES

This invention comprises new animal feed compositions and methods using copper salts of 2-hydroxypyridine-N-oxides as active ingredients for altering the metabolic pattern in the digestive tract of the animals, thereby, improving growth and feed efficiency.

BACKGROUND OF THE INVENTION

In general, 2-hydroxypyridine-N-oxides are reported to have antimicrobial activity at a higher concentration than do their 2-thiol counterparts, such as pyrithione, E. Shaw et al., J. Am. Chem. Soc. 72 4362 (1950) and G. Newbold et al., J. Chem. Soc. 1948 1864. The copper salt of 2-hydroxy-5-methoxy-6-methylpyridine-N-oxide has been reported to have, generally, less antimicrobial activity than does either the corresponding iron salt or the ligand parent, W. Barker et al., J. Antibiotics 32 1096 (1979).

Certain copper, iron and other inorganic salts, such as the metal sulfates, have long been fed to young pigs or ruminants as feed additives, see for example U.S. Pat. No. 2,960,406. To the best of our knowledge, organic copper salts have not been used as animal feed supplements in order to increase growth and feed efficiency in monogastric animals.

The parent compounds as well as their many salts, of which only the copper salts are the active ingredients of this invention, are prepared as described in U.S. Pat. Nos. 2,540,218; 2,752,356; 3,773,770; 3,968,118 and 3,972,888. The compounds of these patents are described to have utility as topical antibacterial or antifungal agents, especially as the active ingredients in antidandruff compositions.

DESCRIPTION OF THE INVENTION

The animal feed compositions of this invention are used to feed monogastric, growing or fattening, meat-producing animals, especially swine and poultry.

For example, it is known to the art that, during assimilation of food, the production of volatile fatty acids in swine should be relatively low in the upper digestive tract and high in the cecal or cecum-like portion. On the other hand, glucose levels should be higher in the upper tract. Lysine is a critically important amino acid which controls the level of incorporation of other amino acids. Therefore, high levels of lysine are also desirable. Often, corn diets, which are naturally low in lysine, are supplemented with lysine and methionine for this reason. The present feed compositions can, also, be advantageously supplemented with methionine. Finally, the level of lactic acid in the digestive tract determines food intake. It is believed that high levels of lactic acid turn off the appetite of the animals.

The object of this invention is to induce low volatile fatty acid levels in the upper digestive tracks together with high glucose levels, high lysine levels and low lactic acid levels. This combination of factors is desired to insure that food intake is high and that a larger than normal quantity of energy is available to the animals for growth from each unit of food in the diet.

The active ingredients, which are useful in the compositions and methods of this invention, are illustrated by the structural formula:

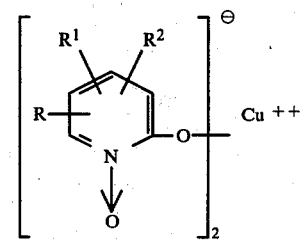

in which R, $R^1$ and $R^2$ are, each, hydrogen, lower alkyl of 1-6 carbons, lower alkoxy of 1-6 carbons, halo such as chloro or bromo, nitro, cyclohexyl, phenyl, cyclohexylmethyl, benzyl or allyl.

Any of the 2-hydroxypyridine-N-oxides in the United States patents, listed above, may serve as ligands for the copper salts, which are the active ingredients on which this invention is based. Since the cost of animal feed supplements must be balanced with the savings to the grower, the 2-hydroxypyridyl ligands with lowest cost of chemical are preferred. In this regard, the compounds of formula I in which R, $R^1$ and $R^2$ are hydrogen, methyl or methoxy are particularly useful.

The cupric salts of formula I are easily prepared from the α-hydroxy parent. For example, the known 2-hydroxypyridine-N-oxides, dissolved in water or aqueous organic solvent mixtures, are reacted with a slight excess of saturated copper sulfate solution. The salt separates, is collected and, then, recrystallized using methanol, dimethylsulfoxide or dioxane as a crystallizing solvent.

The feed compositions of this invention comprise the normal feed rations of the meat producing animals supplemented by a quantity of an active ingredient of formula I, which is effective for improving the growth rate and feed efficiency of the animals but which is not toxic or noxious to a degree that the animals will reduce ingestion of the ration. The quantity of the active ingredient will vary, as is known to the art, with factors such as the cost of the ingredient, the species and size of animal, the relative activity of the compound of formula I or the type of feed ration used as the basal feed.

Examples of the feed rations for swine and poultry are in the examples presented hereafter. Swine rations from weanling to fattening or finishing rations may be supplemented. Swine eat from about 2 lb. per day (for a 25 lb. pig) to 7 lb. per day (for a 150 lb. pig). Most rations are comprised of a corn base supplemented with legume silage, wheat bran, oats, barley, molasses or a protein supplement.

Poultry rations run from starter rations to broiler rations to laying rations. The rations are usually based on ground corn, corn meal or soybean meal. The broiler rations, often, contain high energy supplements such as added fats, proteins and vitamins. Turkey rations are similar, but comprise only a starting ration and a growing ration. Chickens eat from 0.03-0.1 lbs. of feed per day, turkeys twice that much. Estimated intake of feed is dependent on the weight and age of the meat producing animal.

The active ingredients are mixed uniformly with the feed rations to give supplemented rations which are, then, fed as to custom, most often ad libitum. Conveniently, to do this, a premix of the supplemental growth promotant of this invention, optionally combined with or without other supplements such as anthelmintics or antibiotics such as virginiamycin or oxytetracycline, is prepared by the manufacture for sale to the formulators or feed lot operators. The concentration of copper salt in the premix is usually from 5-75% by weight or a concentration 100-2000 times greater than that in the complete feed ration. The premix form may be liquid or solid. Premix vehicles are corn oil, cottonseed oil, molasses or distillers solubles to form a liquid premix preparation. Sucrose, lactose, corn meal, ground corn, flour, calcium carbonate or soybean meal are often used as bases for solid premix preparations. Such premix materials are included in the term "feed compositions" as used herein.

The concentration of the copper salt of formula I in the complete ration is a nontoxic but active quantity chosen, for example, from a range of about 1-75 parts by weight per million (ppm) or 2-90 grams per ton. Advantageously, a quantity is chosen from the range of 5-25 ppm of a copper salt of formula I.

The method of this invention comprises feeding to growing, monogastric, meat-producing animals, especially swine and poultry, an effective growth promoting but nontoxic quantity of a compound of formula I. Other monogastric animals whose digestive tract features fermentation in a cecum or cecum-like chamber are rabbits and horses.

As stated above, the concentration of the growth promotant in the feed compositions used for this purpose is chosen from the range of 1-75 parts of copper salt per million parts of ration or carrier, advantageously 5-25 ppm of the active ingredient.

The supplemented feed rations are presented to the animal by methods known to the art. Ad libitum feeding in the pasture, pen or growing shed is most convenient to increase the growth rate of the animal and to increase the feed efficiency of the growing operation. Alternatively, the same supplemented feeds may be given to ruminant animals, particularly, when the copper salt of formula I is coated to bypass the upper stomach or rumen.

The following working examples and comparative examples are intended to illustrate this invention. All percentages are by weight.

EXAMPLE 1

A swine ration for growing hogs of 40-100 pounds body weight is prepared using the following formula:
Corn ground—78.15%,
Soybean oil meal, 44%—17.0%,
Meat scraps, 50%—3.0%,
Oyster shell flavor—0.4%,
Bone meal—0.5%,
Zinc oxide—0.01%,
Vitamin A, B, $B_{12}$ & D supplement—optional.

2-Hydroxypyridine-N-oxide (10 g) was dissolved in a minimal quantity of water. An excess of copper acetate or sulfate was added as a saturated aqueous solution to separate the crystalline cupric salt of 2-hydroxypyridine-N-oxide, m.p. 292°-294° C.

The ration is supplemented to 100% with 17 p.p.m. of cupric 2-hydroxypyridine-N-oxide distributed through a premix carrier. The ration is fed, ad libitum, to the penned growing or fattening swine.

EXAMPLE 2

A chicken ration for broilers is prepared using the following formula:
Yellow corn meal—67.35%,
Soybean oil mean—24.00%,
Menhaden fish meal—6.00%,
Steamed bone meal—1.00%,
Ground limestone—1.00%,
Iodized salt—0.34%,
25% choline chloride—0.13%,
Vitamin $B_{12}$—0.10%,
Manganese sulfate—0.02%,
Vitamin mix—0.06%.

The ration is supplemented with 20 p.p.m of cupric 2-hydroxypyridine-N-oxide and fed ad libitum to the chickens.

EXAMPLE 3

The following known substituted 2-hydroxypyridine-N-oxides are converted to their cupric salts as described and mixed uniformly with a feed ration, using a premix and the suggested concentrations. The ration is fed to growing monogastric animals ad libitum.

4-cyclohexyl-2-hydroxypyridine-N-oxide—50 p.p.m.
4-benzyl-2-hydroxypyridine-N-oxide—40 p.p.m.
4-methyl-6-phenyl-2-hydroxypyridine-N-oxide—45 p.p.m.
3-allyl-4-methyl-6-phenyl-2-hydroxypyridine-N-oxide—60 p.p.m.
4-methyl-6-isobutryl-2-hydroxypyridine-N-oxide—50 p.p.m.
3-bromo-4,6-dimethyl-2-hydroxypyridine-N-oxide—20 p.p.m.
4,5,6-trimethyl-2-hydroxypyridine-N-oxide—15 p.p.m.
4-methyl-6-isopropyl-2-hydroxypyridine-N-oxide—20 p.p.m.
4-methyl-6-heptyl-2-hydroxypyridine-N-oxide—25 p.p.m.
4-methyl-6-cyclohexylmethyl-2-hydroxypyridine-N-oxide—60 p.p.m.
4,6-diphenyl-2-hydroxypyridine-N-oxide—75 p.p.m.

EXAMPLE 4

In Vitro Swine Procedure

A. Methodology:

A Yorkshire barrow is surgically prepared either with a ileal cannula, which is placed 15 cm. from the ileo-ceco-colic junction, or a cecal cannula, which is placed midway between the apex and origin of the cecum. The animal is fed 4 times daily to restrict intake to 4.5% of body weight in a 30 kg animal or 2.5% of body weight in a 100 kg animal. The swine starter ration is:

|  | % w/w | lbs/ton |
| --- | --- | --- |
| Medium ground shelled corn | 70.60 | 11412 |
| Soybean meal, 44% | 22.00 | 440 |
| Dehydrated alfalfa meal, 17% | 4.50 | 90 |
| Calcium propionate | 0.15 | 3 |
| Vitamin/mineral premix | 2.75 | 55 |

Sampling of the material via the cannula begins 150-180 minutes following the first morning feeding and continues any time from 30-120 minutes thereafter, depending on the quantity of material needed. The sample is maintained in crushed ice, no cooler than 5° C., and is gassed continuously with carbon monoxide. The collected material is filtered. The filtrate is the inoculum used for incubations of the test and control samples. The gassed inoculum, 2.25 ml, is placed in each of 10 gassed test tubes, each containing 0.75 ml of a nutrient solution and 0.5 mg of each test compound. Four blank control tubes, along with the test compound tubes, are incubated 5 hours at 37° C. with agitation. Four more killed tubes are included which are not incubated.

The tubes are each treated with 0.60 ml of a 25% solution of metaphosphoric acid, then, stored at −4° C. until analysis. Samples are thawed and centrifuged for 25 minutes at 20,000 r.p.m. The supernatant liquid is decanted, sampled for gas chromatography and automatic analyzing. The results are fed into a computer for finishing to give figures in which the blank control value is 100%. Virginiamycin is used as a positive control.

B. Results:

| Compound | | VFA | LYS | GLU | LAC* |
|---|---|---|---|---|---|
| 1(a) 2-Hydroxypyridine-N—oxide $Cu^{++}$ (ileal); in DMSO, (dimethylsulfoxide)** | | | | | |
| | | % of blank control values | | | |
| 167 ppm | | 221 | 173 | 99 | 18 |
| 16.7 ppm | | 476 | 155 | 99 | 22 |
| 1.67 ppm | | 344 | 141 | 99 | 31 |
| Control, DMSO; | | | | | |
| 33.3 ppm | | 538 | 76 | 99 | 101 |
| virginiamycin; | | | | | |
| 167 ppm | | 14 | 167 | 101 | 16 |
| (b) 2-Hydroxypyridine-N—oxide, $Cu^{++}$ (ileal) | | | | | |
| 167 ppm | | 4 | 139 | 133 | 22 |
| virginiamycin | | | | | |
| 167 ppm | | 21 | 134 | 133 | 29 |
| (c) 2-Hydroxypyridine-N—oxide, $Cu^{++}$ (cecal) | | | | | |
| 167 ppm | | 77 | 92 | 81 | 208 |
| 16.7 ppm | | 108 | 105 | 89 | 101 |
| 1.67 ppm | | 110 | 96 | 93 | 100 |
| (d) 2-Hydroxypyridine-N—oxide, $Cu^{++}$ (ileal) | | | | | |
| 167 ppm | | 41 | 104 | 130 | 86 |
| 16.7 ppm | | 96 | 93 | 101 | 101 |
| 1.67 ppm | | 110 | 91 | 100 | 99 |
| 0.167 ppm | | 109 | 90 | 99 | 99 |
| (e) 2-Hydroxypyridine-N—oxide, $Cu^{++}$ (cecal) | | | | | |
| 167 ppm | | 84 | 97 | 81 | 140 |
| 16.7 ppm | | 105 | 97 | 52 | 104 |
| 1.67 ppm | | 101 | 98 | 83 | 109 |
| (f) 2-Hydroxypyridine-N—oxide, $Cu^{++}$ (ileal) | | | | | |
| 167 ppm | | 10 | 178 | 287 | 23 |
| 16.7 ppm | | 99 | 93 | 118 | 104 |
| 1.67 ppm | | 108 | 89 | 110 | 101 |
| (g) 2-Hydroxypyridine-N—oxide, $Cu^{++}$ (cecal) | | | | | |
| 167 ppm | | 83 | 69 | 172 | 136 |
| 16.7 ppm | | 100 | 73 | 37 | 106 |
| 1.67 ppm | | 93 | 72 | 50 | 107 |
| 0.17 ppm | | 101 | 71 | 28 | 104 |
| virginiamycin | | | | | |
| 167 ppm | | 89 | 172 | 732 | 49 |
| 16.67 ppm | | 83 | 107 | 524 | 35 |
| 1.67 ppm | | 100 | 74 | 72 | 96 |
| 0.17 ppm | | 94 | 71 | 30 | 93 |
| 2(a) 2-Hydroxypyridine-N—oxide (ileal) | | | | | |
| 167 ppm | | 100 | 88 | 153 | 81 |
| (b) 2-Hydroxypyridine-N—oxide (ileal) | | | | | |
| 167 ppm | | 112 | 23 | 181 | 83 |
| (c) 2-Hydroxypyridine-N—oxide (ileal) | | | | | |
| 167 ppm | | 94 | 97 | 91 | 81 |

*VFA refers to the total of volatile fatty acids, namely acetate, propionate, isobutyrate, butyrate, isovalerate and valerate. LYS is lysine, GLU is glucose and LAC is L-lactic acid.
**The abnormally high VFA values are due to the DMSO carrier but the relative values of the other parameters are not effected.

The parent compound gave results which are, approximately, equal to those of the blank control, overall. The parent is, therefore, very weak, when compared with the copper salt in the tests of section 1 above.

| Compound | | VFA | LYS | GLU | LAC |
|---|---|---|---|---|---|
| 3(a) 2-Hydroxypyridine-N—oxide, $Fe^{+++}$ (ileal) | | | | | |
| 167 ppm (DMSO) | | 108 | 69 | 99 | 94 |
| (b) 2-Hydroxypyridine-N—oxide, $Fe^{+++}$ (ileal) | | | | | |
| 167 ppm | | 104 | 91 | 111 | 105 |
| (c) 2-Hydroxypyridine-N—oxide, $Fe^{+++}$ (ileal) | | | | | |
| 167 ppm | | 105 | 20 | 114 | 100 |
| The ferric salt was, approximately, equivalent in activity compared with the blank control in the desired parameters | | | | | |
| 4(a) Copper sulfate (ileal) | | | | | |
| 333.33 ppm | | 47 | 107 | 113 | 137 |
| 33.3 ppm | | 99 | 101 | 98 | 104 |
| 3.3 ppm | | 99 | 107 | 109 | 113 |
| 5(a) 5-Nitro-2-hydroxypyridine-N—oxide, $Cu^{++}$ (ileal) | | | | | |
| 167 ppm | | 47 | 159 | 110 | 160 |
| 167 ppm | | 48 | 109 | 104 | 106 |

C. Conclusion:

The cupric salt of 2-hydroxypyridine-N-oxide, despite its low water solubility, consistently lowered volatile fatty acids and L-lactic acid, but spared degradation of lysine and glucose. The parent compound, 2-hydroxypyridine-N-oxide, as well as its ferric salt, did not demonstrate this activity consistently.

EXAMPLE 5

Chick Growth Study

A. Methodology:

Five 12 day-old broiler chicks, selected for weight, health and sex are housed in an environmentally controlled room with temperature at 80° F. and humidity at 40%. Chicks are fed ad libitum. Water is offered ad libitum. A rye basal ration is fed during the accumulation period (days 1 and 2), then, mixed with the compound under test or control conditions on 3–17. Either 8 or 16 chicks are used for each test or control group.

| Basal Rye Diet | | |
|---|---|---|
| Diet Ingredients | (% w/w) | (lbs/ton) |
| Ground Rye (fine grind) | 54.6 | 1092 |
| Soybean Meal (49% protein) | 27 | 540 |
| Meat & bone meal (50% protein) | 10 | 200 |
| Dehydrated Alfalfa meal | 1.25 | 25 |
| Fat, animal | 4 | 80 |
| Dried Whey (or lactose) | 1 | 20 |
| Ground Limestone | 0.67 | 13.4 |
| Dicalcium Phosphate | 0.50 | 10 |
| Iodized salt | 0.23 | 4.6 |
| Vitamin premix | 0.175 | * |
| Trace mineral premix | 0.25 | 5 |
| DL methionine (98%) | 0.25 | 5 |
| Choline Chloride (50% aqueous sol.) | 0.150** | 3 |

*Vitamin premix will be mixed into diets when test chemicals are added. 87.5 g vitamin premix/49,912.5 g of basal rye diet.
**Since choline is added as a 50% aqueous solution, percentage in diet is doubled.

B. Results:

| Compound | Dose ppm | No. | 10-day | 17 day | 3-10 day | 10-17 day | 3-17 day | Dead Chicks |
|---|---|---|---|---|---|---|---|---|
| | | | | | % of Control | | | |
| (1) 2-Hydroxypyridine-N—oxide, $Cu^{++}$ | | | | | | | | |
| | 10 | 8 | 100.1 | 96.6 | 102.0 | 106.0 | 103.1 | 1 |

-continued

B. Results:

| Compound | Dose ppm | No. | 10-day | 17 day | 3-10 day % of Control | 10-17 day | 3-17 day | Dead Chicks |
|---|---|---|---|---|---|---|---|---|
| 2-Hydroxypyridine-N—oxide, Cu++ + 0.4% methionine | | | | | | | | |
| | 10 | 8 | 101.3 | 101.4 | 96.3 | 95.0 | 95.8 | 0 |
| Control (grams) | | | | | | | | |
| | 10 | 16 | 163.1* | 263.7* | 1.589** | 2.943** | 2.228*g | 2 |
| (2) 2-Hydroxypyridine-N—oxide, Cu++ | | | | | | | | |
| | 20 | 8 | 101.1 | 98.9 | 97.3 | 101.1 | 98.9 | 4 |
| Control (grams) | | | | | | | | |
| | 0 | 8 | 143.3 | 248.2 | 2.161 | 2.980 | 2.600 g | 2 |
| (3) 2-Hydroxypyridine-N—oxide, Cu++ | | | | | | | | |
| | 1 | 8 | 98.2 | 97.1 | 106.0 | 99.4 | 101.7 | 0 |
| | 10 | 8 | 99.9 | 100.2 | 104.8 | 101.8 | 102.8 | 1 |
| Control (grams) | | | | | | | | |
| | 0 | 8 | 160.5 | 334.0 | 2.084 | 2.398 | 2.277 g | 3 |
| (4) 2-Hydroxypyridine-N—oxide, Cu++ | | | | | | | | |
| | 2.5 | 8 | 99.0 | 97.6 | 105.1 | 105.8 | 105.4 | 1 |
| Control (grams) | | | | | | | | |
| | 0 | 8 | 164.2 | 283.1 | 1.998 | 2.733 | 2.380 g | 0 |

*Weight
**Feed/Gain

EXAMPLE 6

A standard corn based, pre-starter feed composition for feeding 2 week old post weanling pigs was supplemented with 50 ppm of the cupric salt of 2-hydroxypyridine-N-oxide. The animal group comprised 15 replications, each containing 3 treatments, which were untreated corn ration as negative control, virginiamycin at 10 ppm as positive control and the stated test ration. Each replication contained 8 treatment groups in turn comprising 2 pigs per pen.

The following data sumarizes the results:

| | Control — | Virginiamycin 10 ppm | Cu Salt 50 ppm |
|---|---|---|---|
| Starting Wt. (Kg) | 23.7 | 22.51 | 22.3 |
| Average daily gain (0-21 days) | .689 (106%) | .667 (96.8%) | .663 (96.2%) |
| Feed/gain | 2.66 (100%) | 2.56 (97.4%) | 2.55 (95.6%) |

Therefore, the feed composition of this invention, in this test, demonstrated an increase of feed efficiency (feed/gain) over control but not an increase of weight gain.

EXAMPLE 7

The experiment was run similar to that of Example 6 except another control having a rye diet was added. Positive control groups fed virginiamycin (10 ppm) on both corn and rye diets were included along with test groups of 15 ppm and 30 ppm of the cupric salt of 2-hydroxypyridine-N-oxide in corn diet to give the following data:

| | Average Daily Gain (Kg) | | | | | |
|---|---|---|---|---|---|---|
| | Control | Rye Cont. | Vm + | Vm + Rye | Cu Salt 15 ppm | 30 ppm |
| 0-23 days | 0.563 | 0.481 | 0.582 | 0.529 | 0.560 | 0.558 |
| | Feed Conversion Ration | | | | | |
| 0-23 days | 1.901 | 1.955 | 1.905 | 1.909 | 1.828 | 1.925 |

The copper salt supplemented ration showed an increase in daily weight gain over the rye control at 15 and 30 ppm as well as the best feed efficiency or feed conversion ratio at 15 ppm.

It should be noted that the activity of the copper salt in vivo demonstrated in these tests is less than the in vitro results reported hereinabove predicted.

What is claimed is:

1. The method of improving the weight gain and feed efficiency of meat-producing monogastric animals comprising feeding to said animals an effective but nontoxic quantity of a compound of the formula:

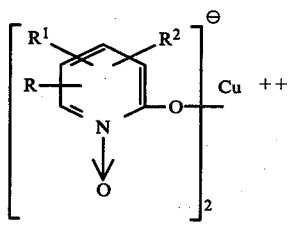

in which R, $R^1$ or $R^2$ are, each, hydrogen, lower alkyl of 1-6 carbons, lower alkoxy of 1-6 carbons, halo, nitro, cyclohexyl, phenyl, cyclohexylmethyl, benzyl or allyl.

2. The method of claim 1 in which the compound is fed in the form of an animal feed ration containing from 1-75 parts of compound per million parts of ration by weight.

3. The method of claim 1 in which the compound is the cupric salt of 2-hydroxypyridine-N-oxide.

4. The method of claim 1 in which the compound is the cupric salt of 2-hydroxypyridine-N-oxide which is fed in the form of an animal feed ration containing from 5-25 parts of compound per million parts of ration by weight.

5. The method of claim 1 in which R, $R^1$ and $R^2$ are, each, hydrogen, methyl or methoxy.

6. An animal feed composition supplemented by a quantity of a compound which is effective for increasing the growth rate and feed efficiency of a meat producing monogastric animal but which is nontoxic to said animal, said compound being of the formula:

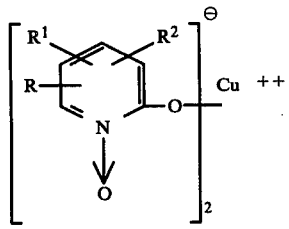

in which R, $R^1$ or $R^2$ are, each, hydrogen, lower alkyl of 1-6 carbons, lower alkoxy of 1-6 carbons, halo, nitro, cyclohexyl, phenyl, cyclohexylmethyl, benzyl or allyl.

7. The composition of claim 6 in which the compound is from 1-75 parts of compound per million parts of composition by weight.

8. The composition of claim 6 in which the compound in the cupric salt of 2-hydroxypyridine-N-oxide.

9. The composition of claim 6 in which the compound is the cupric salt of 2-hydroxypyridine-N-oxide which is present in from 5-25 parts of compound per million parts of composition.

10. The composition of claim 6 in which the compound is the cupric salt of a 2-hydroxypyridine-N-oxide optionally substituted with from 1-3 methyl or methoxy groups.

11. The composition of claims 6, 7, 8, 9 or 10 in which the composition is a whole feed ration.

* * * * *